United States Patent
Scott

[15] 3,677,075
[45] July 18, 1972

[54] METHOD FOR THE DETECTION AND CLASSIFICATION OF DEFECTS IN INTERNAL COMBUSTION ENGINES

[72] Inventor: William Kenneth Scott, Royal Oak, Mich.
[73] Assignee: The United States of America as represented by the Secretary of the Army
[22] Filed: Oct. 20, 1970
[21] Appl. No.: 82,378

[52] U.S. Cl. .......................................................73/117.3
[51] Int. Cl. ....................................................G01m 15/00
[58] Field of Search................................73/116, 136 R, 117.3

[56] References Cited

UNITED STATES PATENTS 3,421,367  1/1969  Mears et al. ............................73/116
2,675,701  4/1954  Bidwell ..............................73/141 A Primary Examiner—Jerry W. Myracle
Attorney—Harry M. Saragovitz, Edward J. Kelly, Herbert Berl and R. M. Lyon

[57] ABSTRACT

The present invention relates to a method for detecting and classifying cylinder defects in internal combustion engines, and more specifically to a method for classifying such defects into a) fuel system and b) compression defects.

7 Claims, 8 Drawing Figures

WILLIAM KENNETH SCOTT
INVENTOR.

BY Harry M. Saragovitz,
Edward J. Kelly, Herbert Berl
& Robert M. Lyon

ATTORNEYS

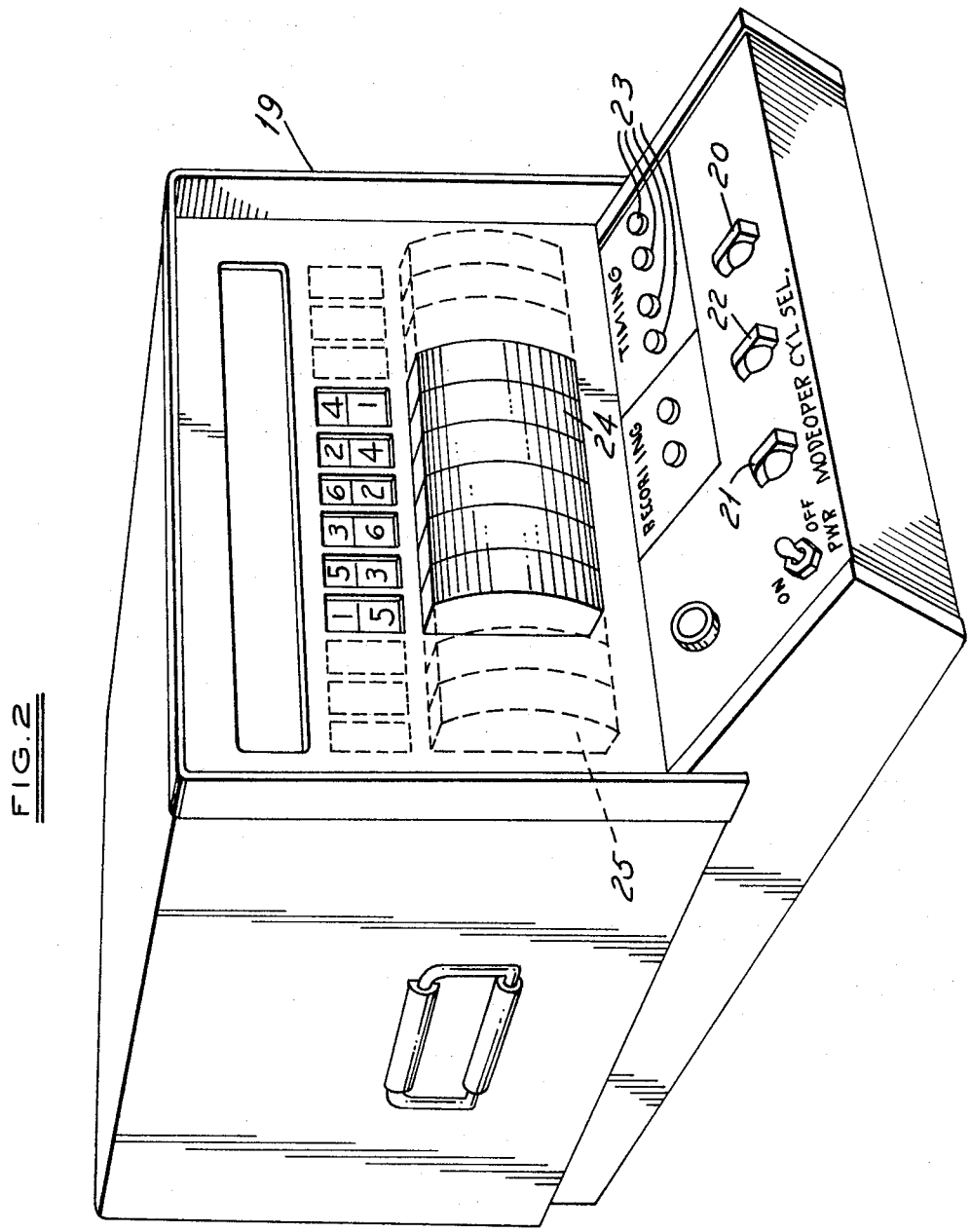

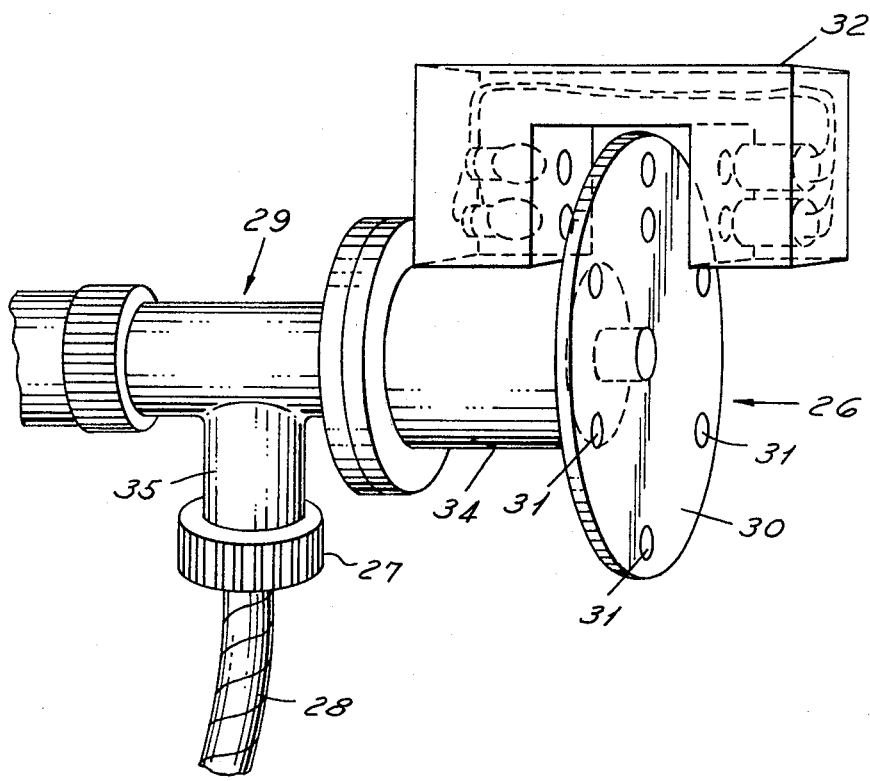

LOCATOR → NORMAL COMPRESSION

WILLIAM KENNETH SCOTT
INVENTOR

BY Harry M. Saragovitz
Edward J. Kelly, Herbert Berl
& Robert M. Lyon
ATTORNEYS 3,677,075

METHOD FOR THE DETECTION AND CLASSIFICATION OF DEFECTS IN INTERNAL COMBUSTION ENGINES

The invention described herein may be manufactured, used, and licensed by or for the Government for governmental purposes without payment to me of any royalty thereon.

BACKGROUND OF THE INVENTION

1. Field of the Invention

Based on the principle that variations in power output resulting from corresponding variations in the instantaneous speed of an engine are directly related to substandard power strokes, the instant invention provides a method for detecting cylinder defects in internal combustion engines and classifying them into: a. fuel system and b. compression defects. More specifically the method comprises the steps of: (a) measuring the cyclic torque variation of an internal combustion engine in the operating mode; (b) measuring the cyclic torque variation of the same engine in the driven mode; and (c) comparing the results of the two measuring steps to determine whether the cause of the defect detected thereby is related to: (1) a fuel system problem, in which case the defect will occur only during the measurement of step a; or (2) is a compression problem, in which case the defect will appear in the measurements of step b. or steps b. and a.

2. Description of the Prior Art

In the prior art, detection of cylinder defects has been accomplished largely through the use of dynamometers attached to the wheels of the vehicle, which instruments were capable of detecting variation in the total output of the engine in the driving mode. All this has supplied useful information regarding the condition of the engine. However, no known rapid method exists for classifying the defect into either a fuel system or an individual cylinder or compression defect so that the rapairman's search for the problem area or component is quite necessarily broad and unnecessarily quite complicated.

It is therefore an object of the present invention to provide a method for simplifying the repairman's search for such defects by supplying a relatively simplified method by which such cylinder defects are not only easily detected but are simultaneously classified into either fuel system or compression defects.

SUMMARY OF THE INVENTION

The instant invention proposes the evaluation of cyclic rotational torque variation of a "dead" engine which is power rotated in combination with the evaluation of observations of the cyclic power variation of the same engine under operating conditions. If the engine does indicate abnormal cyclic power variations under power, the source of the problem can be determined by separating the evaluation into a (1) fuel system or (2) compression problem by rotating the "dead" engine using some second driving means and observing any cyclic rotational torque pattern generated in this mode. When the "dead" engine tests indicate cyclic variation, this is an indication of a compression problem. If no unusual cyclic variation occurs when the "dead" engine is rotated, this indicates that the problem of unusual cyclic power variation detected under the driving mode is due to an injector or fuel problem. If the measure of power level is low as indicated by the calibrated cyclic power test described below, this would indicate either a compression, turbo-charger or general fuel supply problem. Hence the present invention provides cylinder diagnosis as to whether a problem is of the fuel or compression type rather than merely determining that the problem is a cylinder problem.

Generally, the method is achieved using a cylinder performance monitor consisting basically of a processing black box 19 (described in slightly more detail below) which has static input 20 and 21 cyclic static input 22 and a timing reference 23 for coherent sensing of engine cylinders. The information from the cyclic dynamic power input 20 and the timing reference 16 is processed, stored or indicated, Operation can be switched to static input 21 when a fault is apparent and the signal is then applied to the processing network with timing reference 16 for comparison with cyclic dynamic power standards to determine if the fault is either in the fuel system or the compression system. The final display of information can be in any preferred format or applied directly to a diagnostic system readout. The invention can also be made to provide a calibrated output of cyclic dynamic power level which also can be processed for diagnostic application.

It should be noted at this point that the equipment and methods described hereinafter are equally applicable to single as well as multiple cylinder engines.

The method of the instant invention is based on the principle of measuring and displaying instantaneous variations in engine speed while the engine is in the operating and nooperating crank mode.

The power output of a reciprocating engine is, by nature, a series of specific impulses recurring cyclically. For a piston engine, each power stroke produces a discrete impulse. A typical resulting power graph resembles a full wave rectifying voltage wave form shown in FIG. 3.

Failure of any cylinder to fire, or to fire properly, would result in a power curve showing some variation from the standard as shown in FIG. 4. The engine's fly wheel and the momentum of rotating parts can tend to smooth the curve but, nevertheless, there is a distinct dip in power and in velocity associated with the power stroke of each cylinder which is delivering less than average power.

On a typical spark ignition engine, it has been found that the pulses generated by the engine alternator vary in frequency directly with the speed of the engine. To process this frequency variation electronic circuitry has been implemented in a manner that yields a pulsating DC waveform. Experimentation on an eight cylinder engine has shown a definite drop in DC level occurs when deliberate ignition or compression malfunctions are introduced. The DC drop down or negative pulse occurs just after the firing stroke of the effected cylinder or cylinders. On the spark ignition engine, the alternator is chosen as a velocity sensor because of the convenience of monitoring the output. The implementation of this approach, however, can be substituted by using tachometer coupling to engines.

BRIEF DESCRIPTION OF THE DRAWINGS

FIG. 2 is a functional block diagram of the cylinder performance monitor illustrating the concept of the proposed equipment. Solid line block 24 define the basic four to six cylinder configuration and the dotted blocks define those basic modules and meters 25 necessary to expand the hardware to accommodate eight to twelve cylinder engines. Subunits to provide tachometer and/or alternator and generator options are shown as subunits inclosed in dotted line boxes 25.

FIG. 5 represents a tachometer sensor device attached to an engine.

Figure 1:
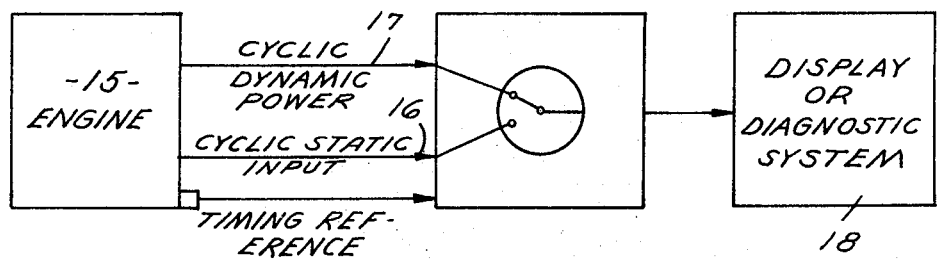
FIG. 1 is a block diagram illustrating the present invention.
Figure 3:
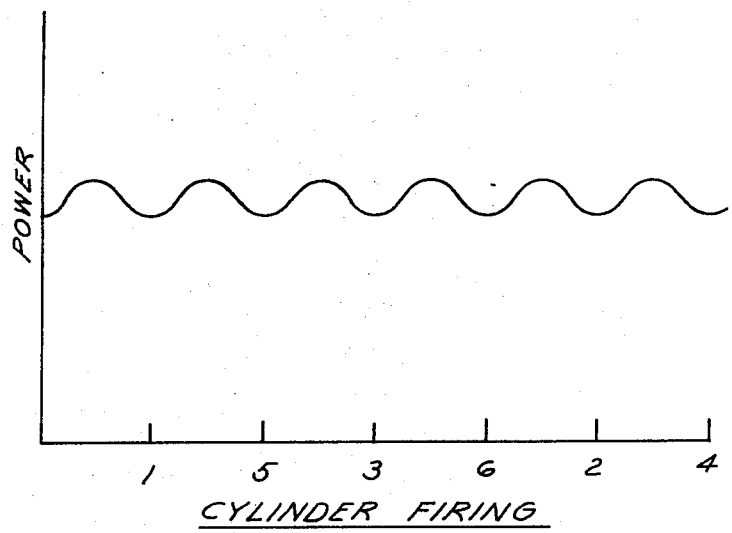
FIG. 3 shows a typical full wave rectifying voltage wave form.
Figure 4:
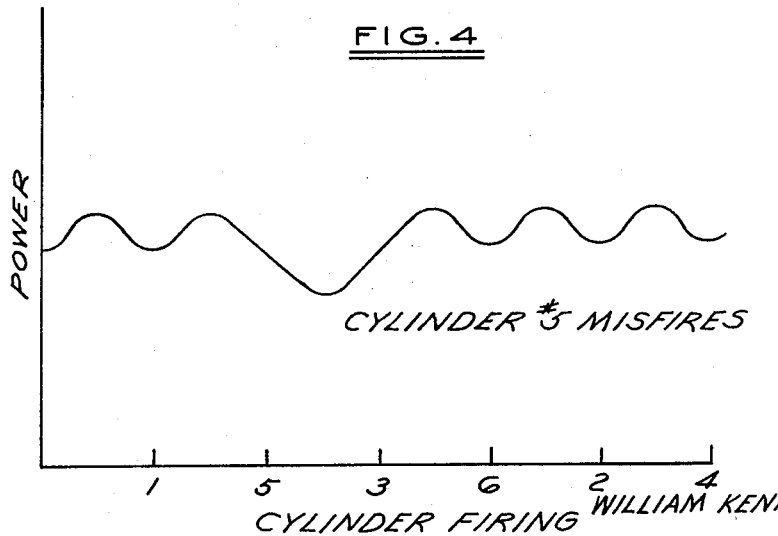
FIG. 4 illustrates power variations with No. 5 cylinder misfiring.
Figure 6:
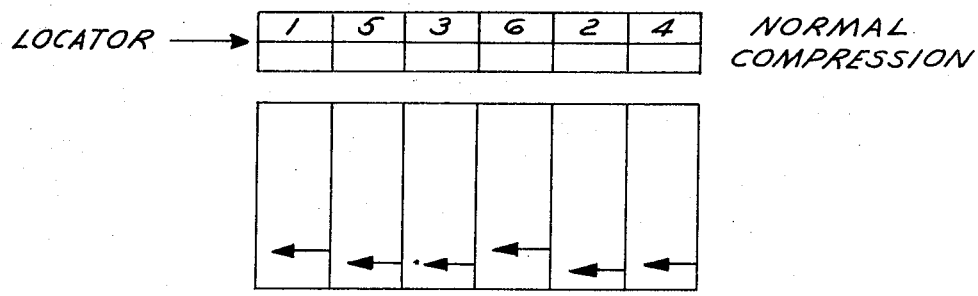
FIG. 6 illustrates the individual cylinder monitoring meters for a normal engine at idle.
Figure 7:
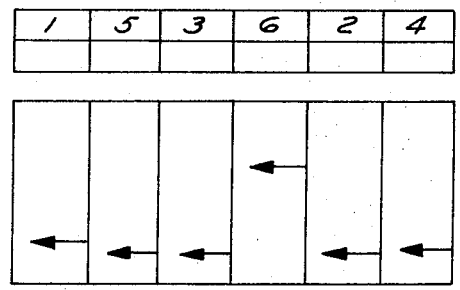
FIG. 7 shows the individual cylinder monitoring meter where No. 6 cylinder is delivering sub-normal power at idle.
Figure 8:
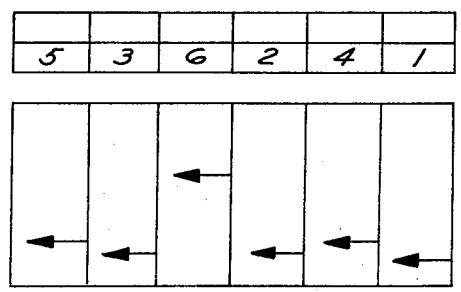
FIG. 8 represents meter presentation during cranking test where No. 6 cylinder is in compression.

The major subunits of the cylinder performance monitor necessary to implement the method of the instant invention are the speed variant DC signal input processing circuits (i.e., tachometer, alternator, and generator), ring counter engine type selector, firing order selector, and an individual meter, analog gates, peak detectors and meter drives.

The input signals for timing are photoelectric diodes operating from a light source controlled by apertures in two metal discs. The cylinder count disc light output will be shaped into narrow pulses properly amplified to provide the cylinder input to a conventional solid state ring counter. The ring counter will be reset on each count reset disc pulse by a single pulse indicating two revolutions of the engine. The ring counter and its subsequent timing are easily modified to accommodate a different number of cylinder engines by insertion of a new disc and circuit inhibition.

The accelerometer and associated electronics option provides similar reference to the tachometer timing disc which provides proper gating of signals for cylinder display.

The output of the DC processing of signals is fed in parallel to the analog gate circuits. The second input to the individual analog gates are the timing complex outputs identifying the interval of time during which the cylinder is monitored. Peak detection of individual cylinders is employed to permit greater threshold for integration and smoother meter presentation.

Expansion of the system can be accomplished to include, for example eight or 12 cylinders engine inputs by the addition of additional tachometer assembly timing discs, added stages in the ring counter selection matrix and individual meter processing chains plus switches and correct inhibit circuits.

Where engine speed cannot be sensed by the use of a mechanical tachometer assembly described, alternate signals from accelerometers, alternators, generators or other pick up devices may be provided. These signals must be processed to a form similar to the DC engine speed, engine cycle and cylinder cycle indicator signals derived from a tachometer and timing assembly.

In the alternator option a filtered DC signal is amplified and delivered to a variable single shot followed by filtering in a differential amplifier. At this point the signal is switched to a common point for amplification, gating, peak detection and displaying for operator interpretation.

The generator option is similar to the alternator with the exception that additional filtering must be provided to guard against brush arcing and operation of the regulator.

It is therefore an object of the present invention to provide a method for evaluation of the cyclic rotational torque variations of a "dead" engine which is power rotated in addition to observing the cyclic power variations under operating conditions.

It is yet another object of my invention to provide cylinder diagnosis as to whether the problem arises in the fuel or compression system rather than just a cylinder malfunction.

Still further objects and advantages of the present invention will become readily apparent to one skilled in the art from the following description of preferred embodiment of the invention and accompanying drawings.

DESCRIPTION OF THE PREFERRED EMBODIMENT

The monitor hookings to the vehicle must be first fully achieved and then started and run until steady idle is achieved. The engine speed should be adjusted to the manufacturers recommended idling speed. Readings can then be made from the individual cylinder monitoring meters and from this presentation the operator can determine which cylinders are low in output. To determine whether the power loss is due to compression or fuel defects, the engine is then stopped and the fuel flow or ignition is shut off. The engine is then cranked in a dead condition by any suitable means and another reading is made of the meters. If the power loss is due to compression a meter will show an increase in voltage corresponding to the increase in engine speed as the leaking cylinder goes through a compression stroke. Where all meters are showing a normal reading, it can be inferred that the observed power loss was due to a fuel system defect and not a compression defect.

A cylinder performance monitor, consisting of a processing block box 19 which has inputs 20 and 21, and cyclic static input 22 and timing reference 23 for coherent sensing of engine cylinders. All the information from cyclic dynamic power input 20 and timing reference 23 is processed, stored or indicated. Operation is switched to static input 21 when a fault is apparent and the signal is then applied to the processing network with timing reference 23 for comparison with cyclic dynamic power standards to determine if the fault is either in the fuel or compression system.

Tachometer adapter coupling 26 shown in FIG. 5 generally consists of bevel gear drive sensing 27 coupled to tachometer output connection, not shown here, on the engines and provides a substitute connection for tachometer cable 28 while servicing engines.

The tachometer assembly also shown in FIG. 5 is a standard tachometer 29 designed to be mounted on tachometer adapter coupling 26 described above. Tachometer 29 used is double ended, that is its shaft extends from both sides of the case. Timing disc 30 containing seven slots 31 for a six cylinder engine is mounted on rear tachometer shaft extension 32. Six of slots 31 are arranged equally spaced around disc 30. Slots 31 are then made to correspond to the power stroke of each cylinder. A seventh slot located on a different diameter is used to identify the number one cylinder firing point. As shown in the drawing, integral lamp photo cell block 32 is mounted on the tachometer to stradle timing disc 30. Each revolution in the engine then produces three pulses from photo cell 32. Each cycle (2 revolutions) of the engine, not shown, produces six photo cell 32 pulses corresponding to cylinder firings and one pulse corresponding to the number one cylinder firing. Timing disc 30 is adjustable on shaft 34 to permit synchronization with the crank shaft of the engine.

In use vehicle tachometer cable 28 is removed from its connection to the engine. The tachometer adapter described above with its integral tachometer 29 and timing assembly 39 is connected to engine tachometer output 35. The vehicle tachometer is then reconnected to the other outlet of the adapter and is driven by bevel gear 27. The next step is to crank the engine over until the number one piston is at top dead center on its firing stroke. Timing disc 39 on the rear of tachometer 29 is then adjusted to line up with a pointer built into the assembly. Once timing disc 29 is adjusted the vehicle is started and operated at idle speed (generally in trucks and other large vehicle engines this is approximately 600 rpm).

Precise indication of individual cylinder performance can be provided through the use of volt meter type arrangement which permits the low power cylinders to produce an output which is indicated on the meter as a significantly above average reading. Other types of indicator systems may also be used.

The equipment may also contain the necessary outputs to enable the speed wave form described above to be displayed on a cathode ray oscilloscope. Although the interpretation of the ray trace may require some skill on the part of the operator it is submitted that the ability for visual examination of the wave forms provides a superior output which can lead to more rapid detection classification and therefore repair of the power system.

The principle of engine analyses through an examination of the minute fluctuations in crank shaft speed as reflected in variations in the speed as produced in the tachometer, is applicable to either diesel engines or spark ignition type engines.

The speed signal is generated by a DC tachometer generator, alternator or generator which is mechanically driven by the engine as described above, i.e., by a belt or gear drive means. The signal is a positive DC voltage whose average level represents the steady state of the engine. A positive going change in this level is caused by an increase in the speed and a negative going change results from a decrease in speed.

When the monitor is operated in the engine idle mode, only negative changes in the speed signal are processed. These changes are the result of substandard power being delivered by a cylinder. In the first stage of processing, the raw tachometer signal is low passed filter to the fundamental frequency of the engine being tested. This results in removing the DC or steady state speed information and enhancing any speed variations occurring at the fundamental frequency. If a negative change in speed is present, it will start during the power stroke of the cylinder affected. The speed decrease will continue into the next cylinder's power stroke and then slowly the dropping speed will be recovered over the remaining portion of the engine cycle. The significant information is contained in the initial dropping speed which occurs during the first power stroke. The remaining speed decrease and eventual recovery are the result of the initial dropping speed. Further, processing is performed so that the significant information (initial speed decrease) can be extracted and the resulting effect during the remainder of the engine cycle be eliminated in the cranking mode of operation. Only positive changes in the speed signal are processed in the driven (cranking) mode. These changes are the result of lower than average compression developed during the compression stroke which produces a speed increase during the low compression stroke. The processing of this signal is performed by the same circuit as that used for the idle engine signal, but with an additional inverting amplifier and a low pass filter inserted before the first differentiation stage. The inverting amplifier provides the proper signal polarity and gain for the processing network. The low pass filter, stays for the lower fundamental frequency at cranking speed.

Analog switches perform the time correlation of the speed signal. This is accomplished by sampling the speed signal at a frequency which includes the number of cylinders in the engine being tested. If there are six cylinders then six samples per engine cycle are obtained by six analog switches. Each switch then transmits the output to a cylinder meter for display. The analog switches are triggered by the TDC timing pulses in the firing order. The sampling interval is 1 over $n$, where $n$ is a cylinder.

I wish it to be understood that I do not desire to be limited to the exact details of construction shown and described, for obvious modifications will occur to a person skilled in the art.

I claim:

1. A method for detecting cylinder defects in an internal combustion engine and classifying them into fuel system and compression defects comprising the steps of:
    a. measuring the cyclic torque variation of said internal combustion engine in the operating mode;
    b. measuring the cyclic torque variation of said internal combustion engine in the driven mode; and
    c. comparing the results of said two measuring steps to determine whether the cause of a defect detected thereby is related to:
        a fuel system problem in said internal combustion engine, in which case said defect will occur only during the measurement of step a; or
        is a compression problem therein, in which case said defect will appear in the measurements of step b.

2. The method as described in claim 1 wherein said measuring of the cyclic torque variation of steps a and b is accomplished by using a tachometer sensor comprising:
    a. a tachometer adapter coupling designed to couple to said tachometer output connection of said internal combustion engine;
    b. a permanent mounting of said tachometer (alternator, generator or other pickup device) for measuring cyclic torque.

3. The method as described in claim 1 wherein said engine in step a measures cyclic torque and is used to provide a calibrated measure of the power output capability of said internal combustion engine through both positive and negative going changes.

4. The method as described in claim 3 wherein the cylinder of said internal combustion engine delivering substandard power is identified and evaluated.

5. The method for detecting cylinder defects in an internal combustion engine and classifying them into fuel system and compression defects comprising the steps of claim 4 wherein relative performance of different types of fuel injections, piston rings, valves, valve setting and cylinder head geometry are identified and evaluated.

6. The method for detecting cylinder defects in an internal combustion engine and classifying them into fuel system and compression defects comprising the steps of claim 5 wherein said method is for measuring a balance of power and determines the total calibrated measure which may be referenced for a family of engines.

7. The method of claim 1 and the additional step of indicating that they do occur simultaneously when fuel systems and compression defects occur at the same time.

* * * * *